Nov. 8, 1966 G. R. SOUTHWORTH 3,284,567

NARROW BANDWIDTH TELEVISION SYSTEM

Filed Nov. 26, 1963 5 Sheets-Sheet 1

INVENTOR.
GLEN R. SOUTHWORTH
BY R. P. Campbell
ATTORNEY

INVENTOR.
GLEN R. SOUTHWORTH
BY R. P. Campbell
ATTORNEY

INVENTOR.
GLEN R. SOUTHWORTH
BY R. P. Campbell
ATTORNEY

INVENTOR.
GLEN R. SOUTHWORTH
BY
ATTORNEY

INVENTOR.
GLEN R. SOUTHWORTH
BY R. P. Campbell
ATTORNEY

United States Patent Office 3,284,567
Patented Nov. 8, 1966

3,284,567
NARROW BANDWIDTH TELEVISION SYSTEM

Glen R. Southworth, Boulder, Colo., assignor to Ball Brothers Research Corporation, Boulder, Colo., a corporation of Colorado Filed Nov. 26, 1963, Ser. No. 326,086
5 Claims. (Cl. 178—6.8)

This invention relates to a television system, and more particularly to new and improved means and techniques for generating and manipulating narrow bandwidth television images.

Several methods have been proposed for reducing the bandwidth necessary to generate, transmit and reproduce a picture in one of several forms. With pictorial information in the form of a video signal, slow scan techniques have been used employing a television camera having very slow line rates and frame rates. Such prior art systems require expensive monitoring equipment involving excessive adjustment time. For example, in order to reconstruct a complete picture for monitoring purposes, due to the extremely slow rate of information required to make up a complete picture, expensive equipment is required to store the picture information on a tube until the complete picture has been reconstructed. In addition, in setting up a television system for operation, many adjustments must be made such as raster size, centering, aspect ratio, linearity, target voltage, beam current, beam focus, video amplitude, black level, optical focus, picture composition, and lens stop setting, to mention a few. It can readily be appreciated that if monitoring must be accomplished at slow scan rates, the amount of time required to make the above adjustments is prohibitive because the effect of a small adjustment of any of the above factors cannot be observed on the monitor for a time interval dependent on the slow scan rate.

An additional problem with narrow bandwidth prior art practices has been the low stability of the systems and poor signal-to-noise ratio. Because of the low frequencies coincident with the low scanning rates, a greater percentage of drift occurs in the camera and subsequent circuits. At conventional scanning rates, microphonic noise and other spurious signals occur in the camera tube, but are usually unnoticeable. However, with present slow scan systems, operating at rates of a few seconds to a few minutes per frame, the video signal output current is reduced tremendously while the amplitude of the microphonic and other spurious signals remains the same. This causes the video signal to be obscured and masked by the microphonic noise.

In another prior art approach, sampling techniques are employed in connection with a wide band television signal obtained by an interlaced scan. This prior art system also presents significant problems. If a vertical line of sampling pulses is used to sweep the raster, a cumbersome system results because the line of sampling pulses must be held in the same place twice in order to get a full picture. Furthermore, each sampling occurrence must be separated by a time interval during which the remaining horizontal lines in one-half of the interlaced raster are sampled through one vertical sweep.

In addition, both of these prior art approaches are inflexible and unusable when movement of objects in the scene occurs. For example, when the frame rate of the resulting slow scan video signal is less than 30 frames per second, or in range of one frame per second, or even one frame for each 10 minutes, moving objects in the scene are blurred in the resulting picture at the receiver, and in certain instances are completely extinguished, resulting in no picture value in that area.

It is an object of the invention to provide a system for generating and manipulating narrow bandwidth television images which involves the use of inexpensive monitoring equipment and minimum adjustment time.

Another object of this invention is to provide such a system having maximum stability characteristics and optimum signal-to-noise ratio properties.

It is a further object of this invention to provide a convenient and efficient system for generating and manipulating narrow bandwidth television images which is capable of faithful pictorial reproduction both in a wide band signal to be monitored at real time and in a narrow band signal to be transmitted and displayed, or otherwise manipulated.

Another object of this invention is to provide such a system which also is capable of accurately portraying pictures in a still form of objects which are moving in the original scene.

Additional objects will become apparent from the following description, which is given primarily for purposes of illustration, and not limitation.

Stated in general terms, the objects of the invention are attained by providing a television system in which a scene is scanned by a camera operating at real time which generates a wide band video signal. This signal is displayed on a monitor operating at scan rates identical with those at which the scene is scanned. A row of narrow sampling pulses is then superimposed upon the real time signal, and moved relative thereto, employing many frames to sample all the elements of the real time picture. The resulting sample pulses are then stretched and held to produce a reduced bandwidth video signal normally having a line rate equivalent to the real time camera frame rate, and a frame rate equal to the time required to move the sampling pulses across the entire picture.

Where the terms "real time" and "wide band" are used herein, they are intended to mean a rate, signal, or frequency which not only includes the values used in American standard broadcasting practice, but also to such rates, signals, and frequencies which are relatively high when compared to the corresponding rates, signals, or frequencies characteristic of the "slow scan," "narrow band," or "sampled" output. Therefore, it should be understood that the invention is not intended to be limited to any fixed range of operating rates, but presupposes a relative difference between the "wide band" and "narrow band" signals which will be determined by the particular application of the invention.

A more detailed description of a specific embodiment of the invention, along with several variations thereof, is given below with reference to the accompanying drawings, wherein.

Figure 2:
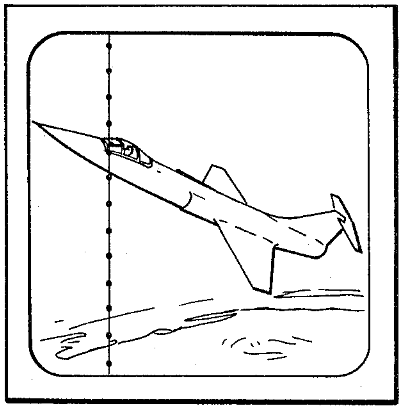
Figure 4:
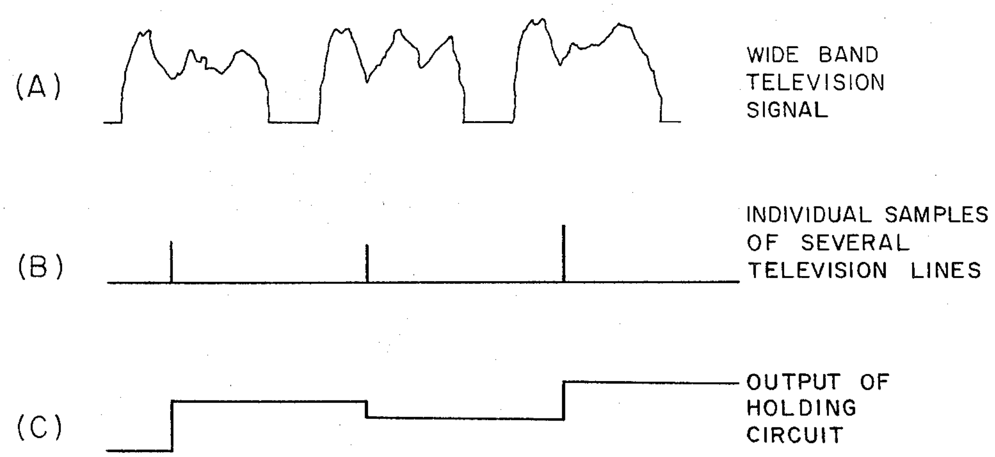

FIGURE 2 diagrammatically illustrates the manner in which a line of sampling pulses are superimposed upon the face of a monitor;

FIGURES 3(A) to 3(D) diagrammatically show several typical scanning patterns;

FIGURES 4(A) to 4(C) show schematic waveform diagrams illustrating the sampling and holding techniques of the present invention.

Figure 5:
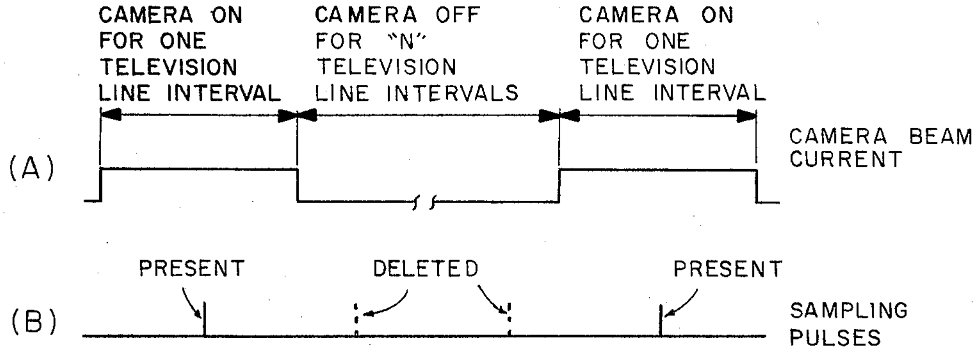

FIGURES 5(A) and 5(B) show schematic waveform diagrams illustrating the blanking pattern employed in the present invention.

Figure 9:
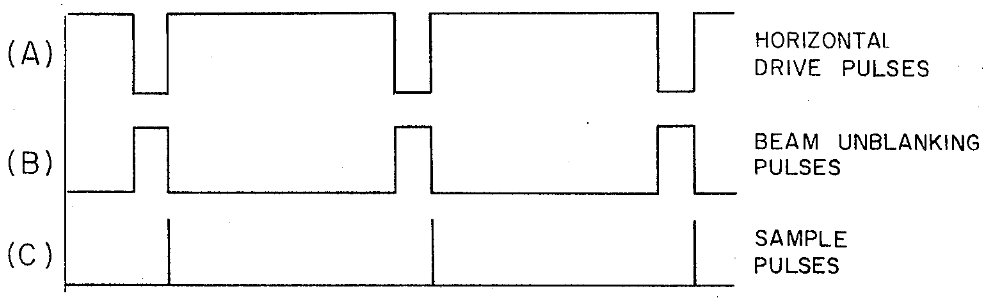
Figure 7:
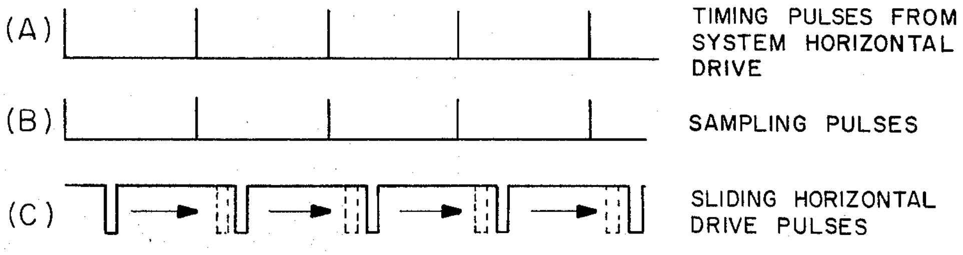
Figure 6:
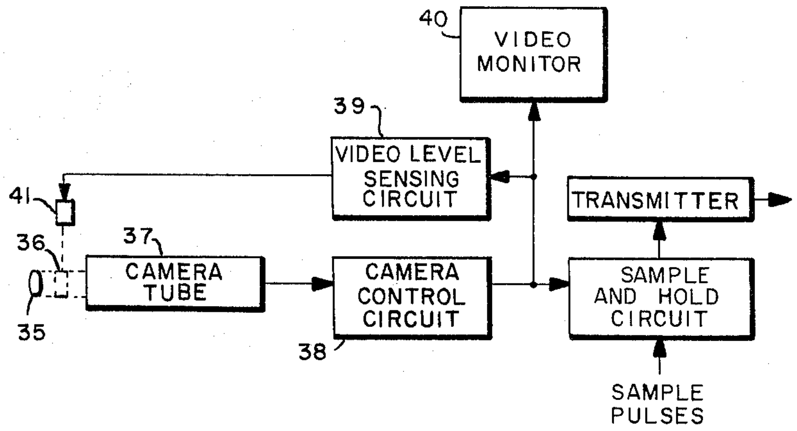
Figure 8:
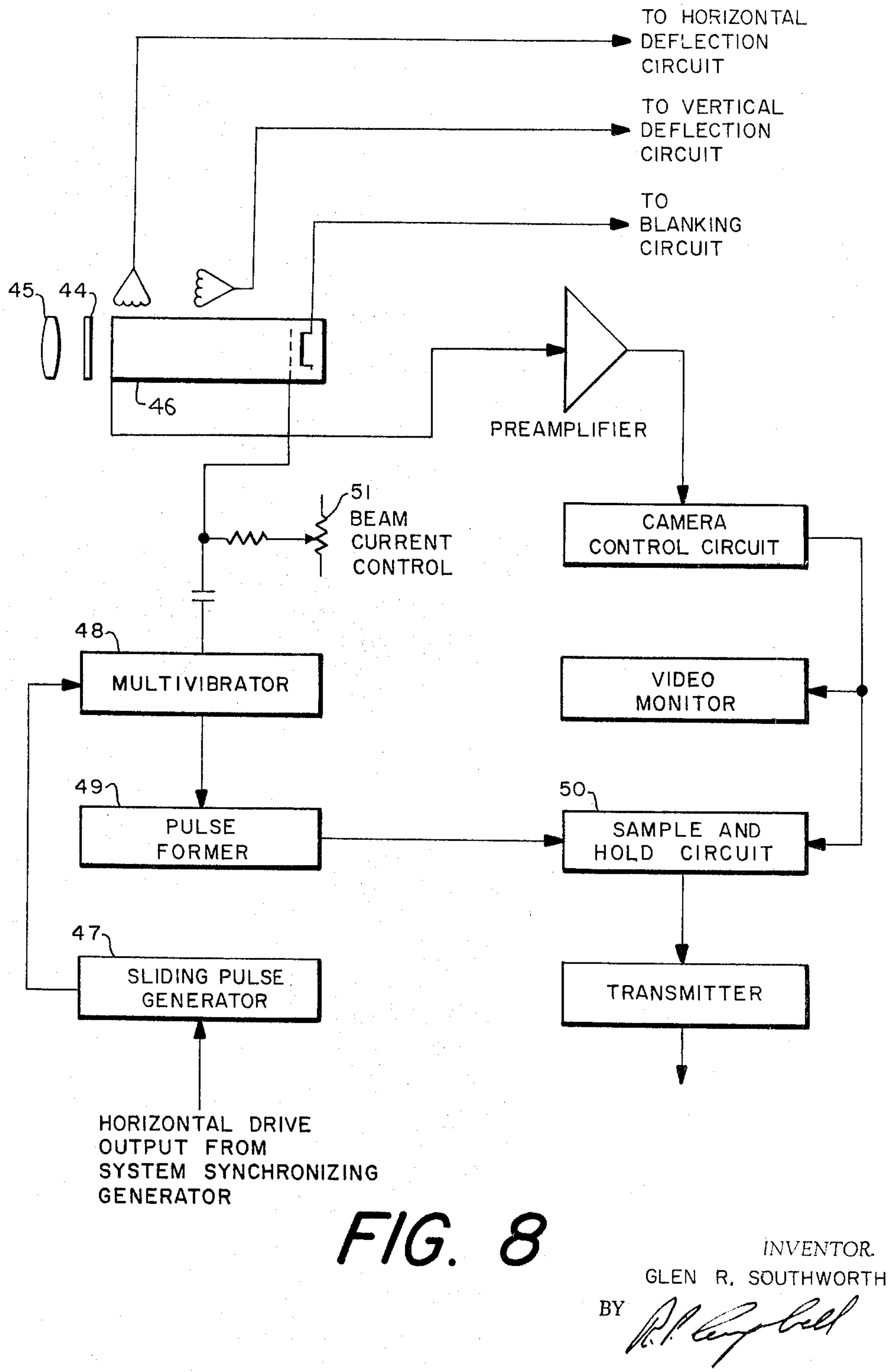

FIGURE 6 is a block diagram of the transmission end of a communication system embodying a variation of the present invention;

FIGURES 7(A) to 7(C) show schematic waveform diagrams of typical pulse trains generated within the present invention;

FIGURE 8 is a block diagram of the transmission end of a communication system demonstrating an additional variation of the present invention; and FIGURES 9(A) an 9(C) show schematic waveform diagrams of typical pulse trains generated within the present invention.

Figures 1A, 1B:
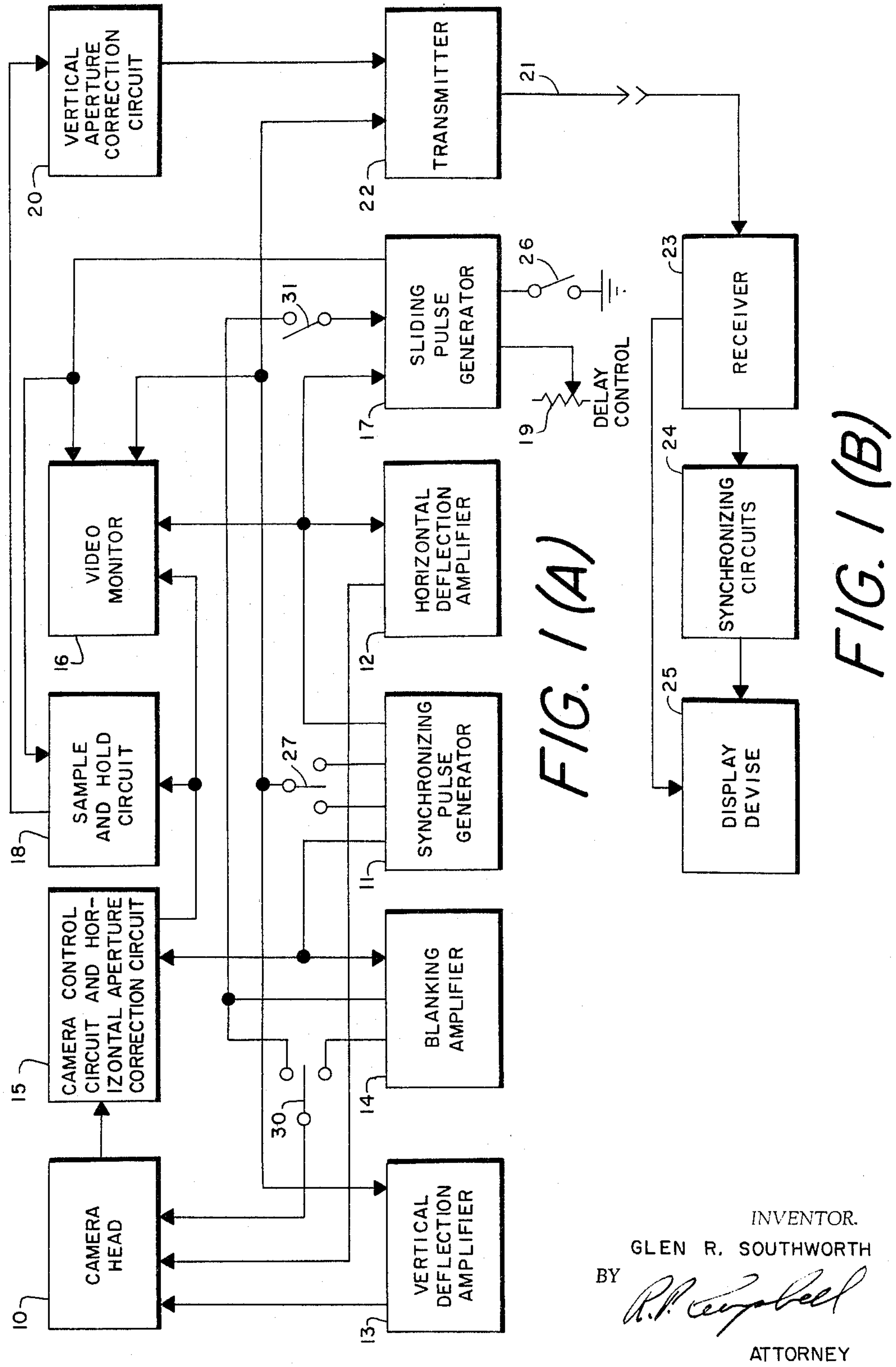
FIGURE 1(A) is a block diagram showing a transmission system embodying the present invention.
FIGURE 1(B) is a similar diagram showing a receiving system.
Figure 3:
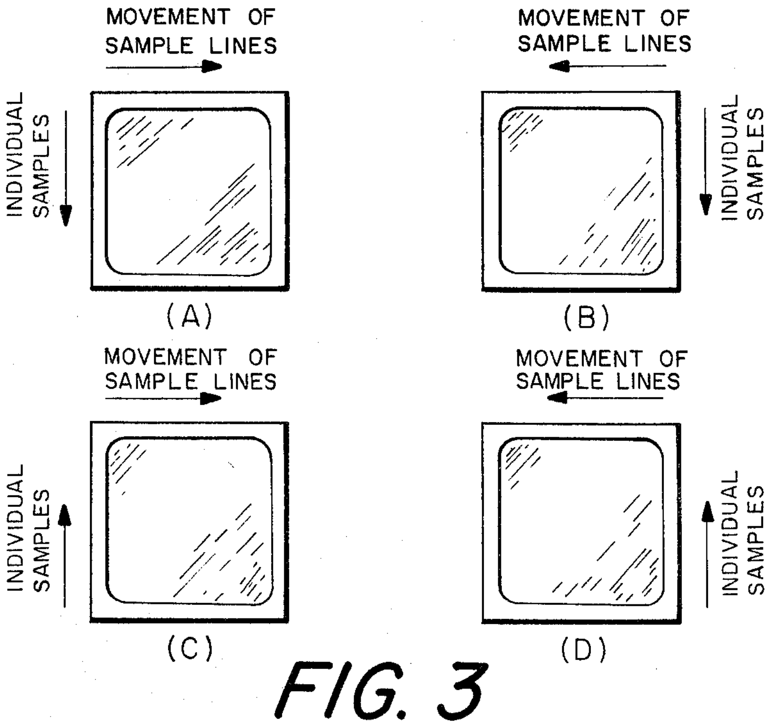

Referring to FIGURE 1(A), a camera head 10 is connected to the respective outputs of horizontal deflection amplifier 12, vertical deflection amplifier 13, and blanking amplifier 14. These three amplifiers are connected to synchronizing pulse generator 11. The camera head 10 receives drive pulses from synchronizing pulse generator 11 so that the camera tube scanning beam is rapidly deflected in a linear manner by a signal from horizontal deflection amplifier 12, and is deflected much more slowly across the other axis, by vertical deflection amplifier 13. In addition, synchronizing pulse generator 11 supplies drive pulses and blanking signals to various other circuits of the system to perform functions which will be described.

The camera head 10 is connected to a camera control circuit 15, the output of which is coupled to video monitor 16 and sample and hold circuit 18. Thus, a signal is generated within camera head 10 and fed to camera control circuit 15 where it is processed by well-known methods. Real time wide band video signals are displayed on video monitor 16 which operates at the same rate as the camera. All optical and electrical adjustments of the camera may be rapidly and easily made by means of real time observation of the picture while it is displayed upon real time video monitor 16.

A sliding pulse generator 17 is coupled to the horizontal drive output of synchronizing pulse generator 11 and generates a signal containing very narrow pulses, typically in the order of one-hundred nanoseconds or less. The output of sliding pulse generator 17 is coupled to video monitor 16 and also to sample and hold circuit 18. A delay control 19 is connected to sliding pulse generator 17 and normally adjusted so that the row of sampling pulses, which appear on video monitor 16 (as shown diagrammatically in FIGURE 2), begins at a particular edge of the picture, depending on the direction of scan desired. A gradual change in the voltage applied to the sliding pulse generator 17 is caused and a low frequency saw-tooth wave form is generated when switch 26 is closed. This causes the previously stationary line of sampling pulses to slowly change its position and apparently move across the picture displayed on real time video monitor 16. This movement is due to a change in the timing relationship between the sampling pulses and the horizontal scanning rate of the camera.

FIGURES 3(A) to 3(D) diagrammatically illustrate scanning patterns which may be employed in the present invention. Thus, the individual samples comprising a line of sampling pulses may be taken up or down and the line of sampling pulses may be moved from left to right or from right to left across the television raster. If the line of sampling pulses moves slowly enough, for example, at a fraction of a microsecond per frame of the real time camera, then all elements of the original picture will be sampled. This is diagrammatically illustrated by FIGURES 4(A) and 4(B) showing samples of several elements of a typical wide band television signal. The desired narrow band television signal is obtained by stretching or holding each of these samples as shown in FIGURE 4(C). The resulting signal thus generated has a line rate equal to the frame rate of the real time camera, and a frame rate equal to the amount of time required to move a row of sampling pulses across the real time raster.

The resulting narrow bandwidth signal can be utilized in any one of a number of ways. For example, transmitter 22 is shown for transmitting the signal 21 by any means sufficient to carry a signal having its particular frequency or bandwidth, to a receiver 23 shown in FIGURE 1(B). The output of the receiver 23 may be coupled to synchronizing circuits 24 and also to a display device 25. The display device 25 is driven by synchronizing pulses removed from the transmitted signal 21 by synchronizing circuits 24.

Many factors are involved in the selection of both vertical and horizontal scanning rates. Some of these are the desired bandwidth of the final signal, vertical resolution, horizontal resolution, transmission time, and to a lesser degree camera sensitvity, signal-to-noise ratio, and real time monitor flicker. By variations and techniques which form a part of the present invention these factors can be optimized at all times by properly adjusting the vertical and horizontal rates. This can be done by setting the timing of the system synchronizing pulse generator 11. Normally, it has been found desirable to set the timing so that the vertical scan rate is an integral divisor of the horizontal scan rate; for example, 250, 500, 700, 1,000, et cetera, as compared to the American standard broadcasting practice of 262.5 which is used to obtain interlaced reproduction. Thus, the horizontal scanning rate can be any convenient value, typically being a value between 3,000 and 30,000 lines per second and the vertical scan rate typically can be a value between one and 200 frames per second.

It should be noted that the bandwidth of the resulting narrow bandwidth signal is not necessarily dependent upon the sampling rate employed. For example, if a horizontal scan rate of 30,000 lines per second and a sampling rate of one sample per line are chosen, this results in 30,000 samples per second and an analog bandwidth of approximately 15,000 cycles per second, according to the well-known Nyquist theorem. However, regardless of the number of samples taken during a given time interval, the actual bandwidth of the output signal need only be sufficiently great to reproduce the amount of pictorial detail which is present in the time interval represented by one vertical scan of the real time camera. Therefore, if the real time camera is made to operate at the rate of one frame per second, resulting in 30,000 samples per second, and the maximum attainable resolution of the vertical axis is on the order of 1,000 television lines, then the information input rate to the sampling circuits will not exceed 500 cycles per second. Therefore, nothing of higher frequency than this information rate need be transmitted from the output of the holding circuits in this example.

When very slow frame rates are employed in the real time camera in order to generate a very narrow band signal, excessive real time monitor flicker occurs with standard phosphors. This is overcome in the present invention through the use of a long persistence phosphor in the real time monitor. Also, since a higher rate monitor is primarily an aid to the operator for system setup and adjustment, a switch 27 can be connected to the system synchronizing pulse generator 11 to first supply a rapid vertical scan rate to the system for setup purposes, and then a reduced vertical scan rate for operational purposes.

It should be noted that the present invention provides for 90-degree rotation of the scanning axis due to the sampling process employed, causing the real time raster and the slow scan raster to be in orthogonal relationship. This allows the use of electrical aperture correction along both axes to compensate for resolution lost due to the finite size of the electron scanning beam in the camera pick-up tube. Thus, aperture correction is first performed along the horizontal axis by well-known circuitry in the camera control circuit 15. Then a vertical aperture correction circuit 20, which follows the sample and hold circuit 18, provides compensation on the vertical axis, resulting in an unusually detailed picture reproduction.

Camera tube sensitivity can be affected when rapid horizontal scan rates are used in conjunction with slow vertical scan rates. This is due to the fact that although many thousands of horizontal scans can take place between the top and bottom of the camera tube target, the finite width of the scanning beam can cause an excessive overlap between the scans, resulting in a lowered output from the camera tube.

Either one of two variations of the basic embodiment of this invention can be used to combat this effect. When successive readouts are not too destructive, camera tubes having storage characteristics are employed with good results. However, for absolute prevention, a special blanking signal is utilized in conjunction with conventional low storage camera tubes.

Referring to FIGURE 1(A), blanking signals are provided by synchronizing pulse generator 11 and amplified by blanking amplifier 14. This amplified output is fed to the camera head 10 via switch 30 and to sliding pulse generator 17 via switch 31, and serves to stop the operation of these circuits during the blanking interval. Thus, the sampling pulses are deleted during the time interval when the camera is turned off so that the output of the sample and hold circuits is not returned to ground potential during this interval. This phenomena is shown schematically by waveforms of FIGURES 5(A) and 5(B).

A further variation of the above embodiment of the present invention can be used to prepare the output signal for use in synchronous communication systems, especially where the signal is to be converted into digital form. The sampling pulses of the above embodiment are constantly varying in phase with respect to the picture information; that is, one sample in the vertical line of sampling pulses will not fall directly beneath the previous sample, but will have a slight phase displacement in a constant direction so that over the period of one complete scan, the sampling pulses and the picture information will be displaced 360° in phase. It is well known that such a displacement would not be acceptable in digital information signals and considerable additional circuitry would be needed to compensate for this displacement.

However, by employing a vertical line of relatively phase-stationary sampling pulses and employing circuitry to vary the timing rate of the horizontal drive pulses from synchronizing pulse generator 11, the timing rate of the horizontal scan of the television camera 10 can be varied. The result of utilizing this procedure is to obtain a complete scan of the raster pattern by figuratively moving the picture information in phase relative to the stationary line of sampling pulses, thereby achieving a complete scan of the raster, yet avoiding phase distortion in the line of sampling pulses which are subsequently to be converted into digital form. It should also be noted that the aforementioned blanking pulses may also be obtained directly from this horizontal drive pulse having an altered timing rate.

This new relationship between the timing pulses, the sampling pulses, and the sliding horizontal drive pulses is illustrated by the waveform diagrams of FIGURES 7(A) to 7(C).

This invention is capable of utilizing display monitors incorporating cathode ray tubes employing a conventional medium persistence phosphor, a medium long persistence phosphor, or a storage type of phosphor. The transducer employed in the camera head may be a vidicon or orthicon, image orthicon, iconoscope, or other type.

The display device 25 may be a slow scan television monitor using photographic time exposures for image reconstruction, a storage television monitor using an Iatron or other storage tube for direct viewing, a scan converter for translating the slow scan image to other scan rates such as those used commercially, a fascimile machine for producing hard copy or other device.

The use of real time scanning and real time monitoring in the system of the invention provides for rapid and positive camera adjustment. Microphonic noise in the camera tube is avoided or suppressed because the output of the camera tube representing conversion of light to electrical energy is higher due to a well-known relationship between scanning velocity and voltage output. Since higher frequencies are used, the electrical circuits provide a more stable and drift-free performance. A row of narrow sampling pulses is then superimposed upon the real time signal, and moved relative thereto, employing many frames to sample all the elements of the real time picture. The resulting sample pulses are then stretched and held to produce a reduced bandwidth video signal normally having a line rate equivalent to the real time camera frame rate, and a frame rate equal to the time required to move the sampling pulses across the entire picture. It is also an advantage of the invention to provide a circuitry capable of operation at different rates so as to produce a signal having the desired narrow bandwidth. An additional advantage of the present invention is to provide for improved camera sensitivity even when rapid horizontal scan rates are used in conjunction with unusually low vertical scan rates. This is accomplished either by the selection of camera tubes having target storage characteristics in which successive readouts are relatively non-destructive, or by the use of a specially-timed blanking signal in conjunction with conventional low storage camera tubes.

A further advantage of the present invention resides in its provision of an accurate still reproduction of moving objects. A still further advantage of the present invention is in its provision of a narrow bandwidth signal which is useful in synchronous systems or for conversion into digital form.

The embodiment of the invention described hereinbefore requires that a stationary image or scene be focused on the target of the camera tube during the period of time in which at least one complete scene is scanned. This naturally precludes any acceptable reproduction of moving objects in the scene. By means of a second basic embodiment having several variations, the ability to accurately portray moving objects in the scene can be accorded to the invention.

One method of accomplishing this is to employ a mechanical shutter in combination with a storage type of vidicon camera tube in which the readout scan of the electron beam is not only non-destructive, but actually regenerative. Referring to FIGURE 6, a portion of the basic embodiment of the invention is shown along with the abovementioned additions to permit the stopping and accurate portrayal of moving objects. A shutter 36 is positioned between a lens 35 and a camera tube 37 having the characteristics mentioned above. The output of camera tube 37 is fed to camera control circuit 38. The shutter 36 is a simple mechanical type of shutter such as that used in photography, but other methods could be employed such as electronic shuttering by target pulsing, or varying the target voltage so as to increase or decrease the sensitivity of the target to light.

Since the camera tube 37 employed retains the target charge image, and since readout by scanning of the electron beam regenerates the target charge image, continuous readouts can be obtained up to a period of ten minutes with high resolution and good gray scale. Thus, the shutter 36 can be opened for a short period, the charge image can be formed on the target of camera tube 37, and the electrical wide band output signal can be examined on the real time video monitor 40 while the necessary adjustments are made. Then the sampling process can be initiated and a narrow bandwidth television signal generated. Upon utilization of the narrow bandwidth television signal, the charge image on the target of the camera tube 37 can be erased simply by extinguishing the beam current, resulting in a disappearance of the charge image within a few seconds. If desired, this erasure process can be more rapidly performed by evenly flooding the camera tube 37 with a source of light during this period.

A variation of this technique will provide capability for integrating the light falling upon the camera tube target, resulting in proper output at all times. Thus, the sensitivity and electronic output of a camera tube 37 is dependent upon the duration as well as the intensity of light falling upon the target. Therefore, when scenes are to be transmitted under conditions of very low light levels, the shutter 36 can be actuated by means of solenoid 41 and left open until the video level at the output of camera control circuit 38 builds up to a point sufficient to actuate video level sensing circuit 39, thus closing shutter 36. This will provide automatic commencement of the sampling process as well as the erasure and reshuttering processes at the end of a sampling cycle, thus allowing a complete and automatic remote operation of the system.

An additional embodiment of the invention provides excellent stop motion characteristics even while using conventional camera tubes, although vidicon tubes having a long lag target are generally preferred. Referring to FIGURE 8, the circuits involved in this embodiment along with portions of the basic embodiment are shown. A shutter 44 is positioned between a lens 45 and a vidicon tube 46. Horizontal, vertical and blanking signals are furnished to the vidicon tube 46 by the system synchronizing generator (not shown). Sliding pulse generator 47, driven by horizontal drive pulses from the system synchronizing generator, triggers a multivibrator 48 which produces narrow square-top pulses. These pulses turn the beam current on and off in the vidicon tube 46. The output of the multivibrator 48 is also coupled to a pulse former 49, and the negative-going edges of these pulses generate a sampling pulse which is applied to the sample and hold circuit 50.

In operation, the shutter 44 is momentarily opened and allows light to fall on the target of the camera tube 46. Initially, the beam current controlled by beam current control 51 is completely turned off, although the deflection circuits are continuously functioning. When the sampling process begins, the beam current is automatically controlled by pulses from mulivibrator 48 so that it is turned on slightly before the sample is taken from the video output of the system and turned off immediately after the sample has been taken. FIGURES 9(A) to 9(C) are waveform diagrams illustrating the timing relationship between the horizontal drive pulses, beam current control or beam unblanking pulses, and the sampling pulses. The purpose of this timing arrangement is to prevent destructive readout of the target image prior to sampling each element. The beam unblanking pulse coming from the multivibrator can be dispensed with if the sampling pulse itself is used to turn the beam current on. However, by using the wide unblanking pulse shown in FIGURE 9(B), before the sample is taken, automatic erasure of the target charge image can be obtained, thus eliminating the need for a separate erasure cycle at the conclusion of the sampling readout. Erasure is necessary even though the readout is destructive since a faint after-image may remain on the target which would interfere with subsequent target images.

The above description shows that the method and apparatus of the present invention provide a simple and convenient means for generating and manipulating narrow bandwidth television images. Furthermore, by employing non-interlaced scanning patterns along with sampling techniques, faithful pictorial reproduction can be obtained both in the wide band signal to be monitored at real time, and in the narrow band signal to be transmitted and displayed, or otherwise manipulated. Moreover, by making several additions to and alterations in the basic embodiment of the present invention, it is possible to accurately portray pictures in a still form of objects which are moving in the original scene.

From the above description of the invention, it will be apparent that various modifications in the method and apparatus described in detail herein may be made within the scope of the invention. For example, many types of equipment could be employed to perform the basic function described herein, such as video cameras and types of camera tubes. Also, as previously mentioned, many different scanning rates and sampling rates could be used, the selection of which depends upon the optimization of many variable factors. Therefore, the invention is not intended to be limited to the specific details of the apparatus described herein.

What is claimed is:

1. A reduced bandwidth television system which comprises means for generating a wide band television signal representative of at least one frame of a scene, wide band signal monitoring means for receiving and displaying the wide band signal information for adjustment purposes, and means for sampling the wide band television signal to produce a series of sample pulses, each of said respective pulses having an amplitude proportional to the amplitude of the wide band television signal at the instant it is sampled and said series of sample pulses constituting a narrow band television signal for transmission purposes having a line rate equal to the frame rate of the wide band television signal and a frame rate equal to the amount of time required to sample the entire scene.

2. A reduced bandwidth television system which comprises means for generating a wide band television signal representative of at least one frame of a scene, electrical aperture correction means acting on said wide band television signal to improve resolution along the horizontal axis of the wide band raster, means for sampling said wide band television signal to produce a series of sample pulses wherein each respective pulse has an amplitude proportional to the amplitude of the wide band television signal at the instant it is sampled and said series of sample pulses constitutes a narrow band television signal having a line rate equal to the frame rate of the wide band television signal and a frame rate equal to the amount of time required to sample the entire scene with a narrow band raster pattern in orthogonal relationship to the wide band raster, and electrical aperture correction means acting on said narrow band television signal for improving resolution along the horizontal axis of said narrow band raster.

3. A reduced bandwidth television system which comprises means for generating a wide band television signal representative of at least one frame of a scene, a source of blanking signals, a source of sampling pulses, means for controlling said wide band signal generating means and said sampling pulse source to stop operation of these means during the blanking intervals, wide band signal monitoring means for receiving said wide band television signal and displaying the information thereon for adjustment purposes, and means for sampling the wide band television signal to produce a series of sample pulses wherein each respective pulse has an amplitude proportional to the amplitude of the wide band television signal at the instant it is sampled and said series of sample pulses constitutes a narrow band television signal for transmission purposes having a line rate equal to the frame rate of the wide band television signal and a frame rate equal to the amount of time required to sample the entire scene.

4. A method for generating television signals having different bandwidths but carrying substantially the same information, said method comprising: scanning a scene with a camera beam and generating a wide band television signal carrying information indicative of said scanned scene; displaying the information carried by said wide band television signal on a monitor for adjustment purposes; and repeatedly sampling said wide band television signal to produce a series of pulses each of which has an amplitude proportional to the amplitude of said wide band television signal at the instant it is sampled, said series of pulses constituting a narrow band television signal for transmission purposes having a line rate equal to the frame rate of the camera beam and a frame rate equal to the amount of time required to entirely sample the information carried by said wide band television signal.

5. A method for generating television signals having different bandwidths but carrying substantially the same information, said method comprising: momentarily exposing a camera tube target to an image; performing a continuous readout of the target charge image to produce a wide band television signal; retaining a charge image on the camera tube by regenerating the charge image during readout; displaying the information carried by said wide band television signal on a monitor for adjustment purposes; and repeatedly sampling the wide band television signal to produce a series of pulses each of which has an amplitude proportional to the amplitude of the wide band television signal at the instant it is sampled, said series of pulses constituting a narrow band television signal for transmission purposes having a line rate equal to the frame rate of the camera beam and a frame rate equal to the amount of time required to entirely sample said wide band television signal and erase the target image charge.

References Cited by the Examiner

UNITED STATES PATENTS

| | | | |
|---|---|---|---|
| 2,852,608 | 9/1958 | Sziklai et al. | 179—15.55 |
| 2,909,600 | 10/1959 | Becker | 178—6 |
| 2,921,124 | 1/1960 | Graham | 178—6 |

DAVID G. REDINBAUGH, *Primary Examiner.*

R. L. RICHARDSON, *Assistant Examiner.*